Jan. 2, 1940.  C. A. RODMAN  2,185,754

REFRIGERATING AND DISPENSING APPARATUS

Filed Oct. 24, 1935  4 Sheets-Sheet 1

INVENTOR
Clarence A. Rodman,
BY
Justin W. Macklin,
ATTORNEY

Jan. 2, 1940.  C. A. RODMAN  2,185,754
REFRIGERATING AND DISPENSING APPARATUS
Filed Oct. 24, 1935  4 Sheets—Sheet 2
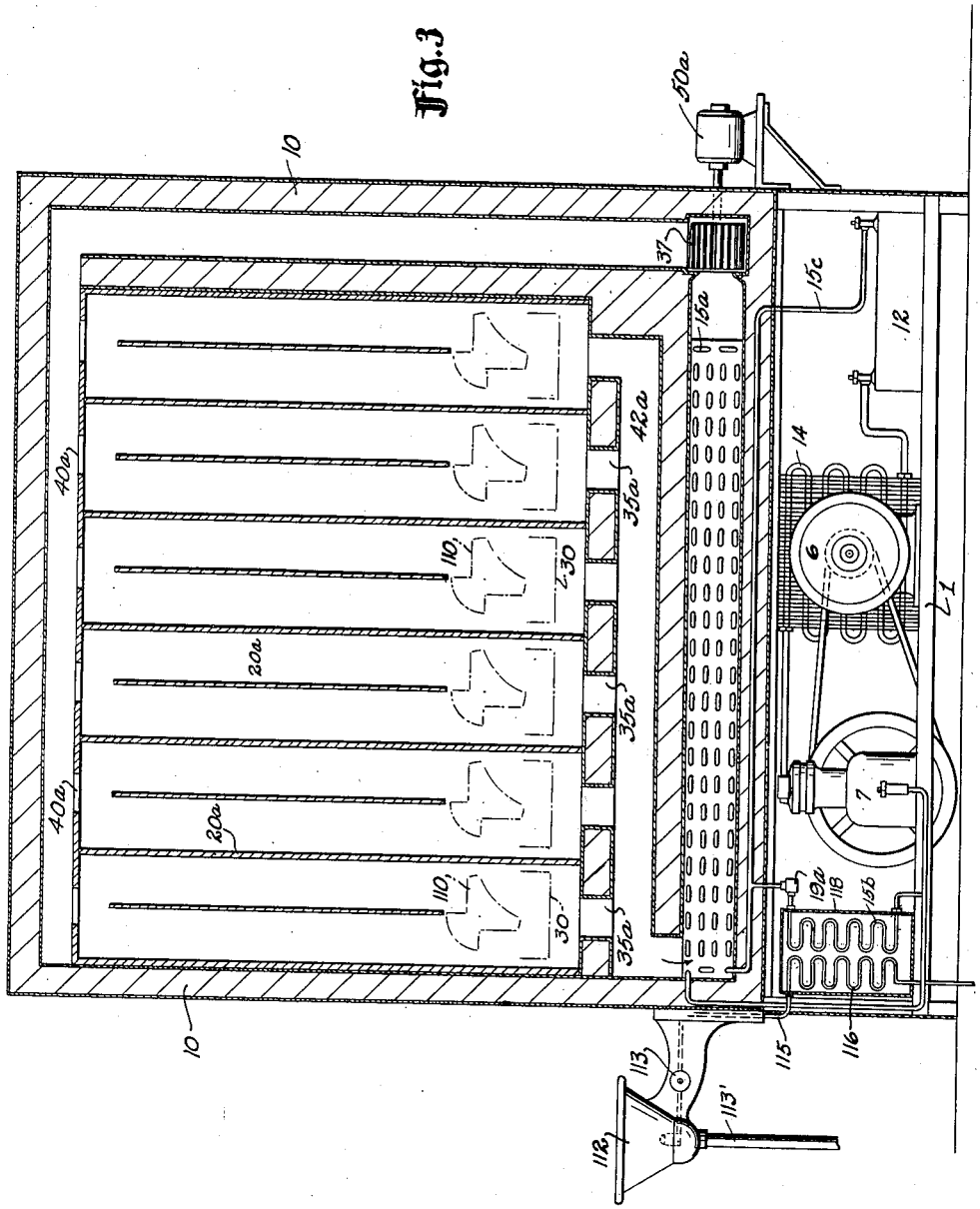
INVENTOR
Clarence A. Rodman,
BY
Justin W. Macklin
ATTORNEY Jan. 2, 1940.   C. A. RODMAN   2,185,754
REFRIGERATING AND DISPENSING APPARATUS
Filed Oct. 24, 1935   4 Sheets-Sheet 3
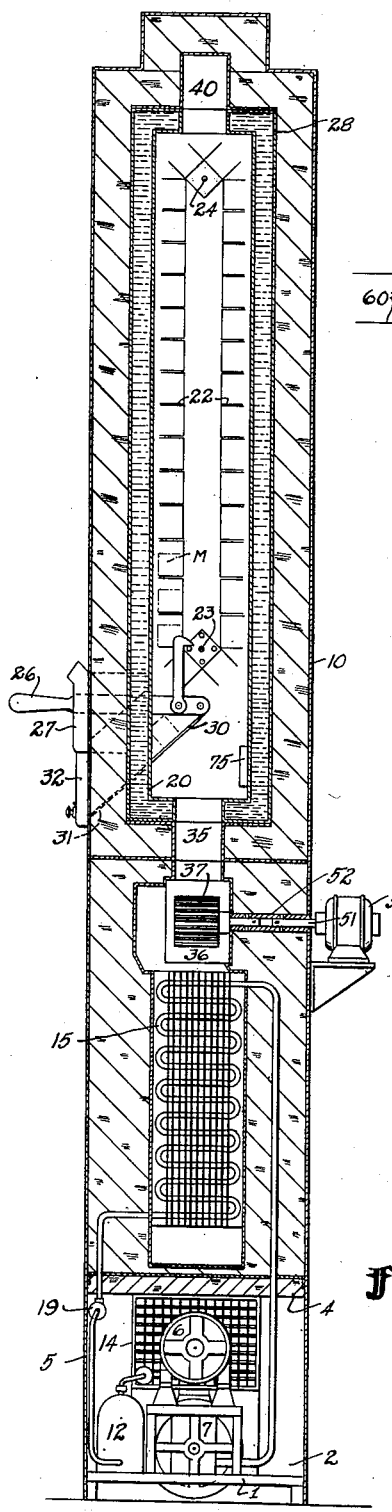
INVENTOR
Clarence A. Rodman,
BY
Justin W. Macklin
ATTORNEY Jan. 2, 1940.  C. A. RODMAN  2,185,754
REFRIGERATING AND DISPENSING APPARATUS
Filed Oct. 24, 1935  4 Sheets—Sheet 4
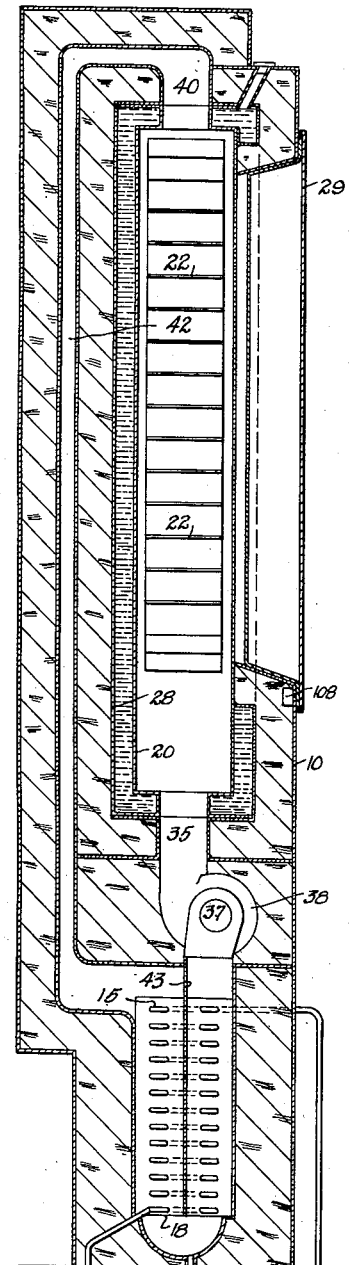
Fig.7
Fig.8
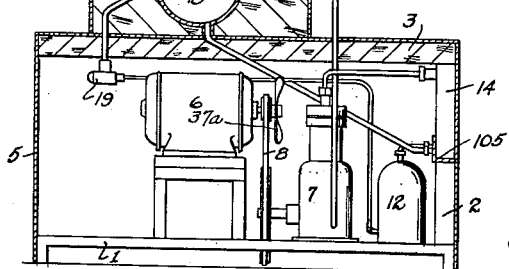
INVENTOR
Clarence A. Rodman,
BY
Justin W. Macklin,
ATTORNEY Patented Jan. 2, 1940

2,185,754

UNITED STATES PATENT OFFICE 2,185,754

REFRIGERATING AND DISPENSING APPARATUS

Clarence A. Rodman, Detroit, Mich.

Application October 24, 1935, Serial No. 46,544

3 Claims. (Cl. 62—6)

This invention relates to an air conditioning and refrigerating device.

Broadly, the objects of the present invention are set forth in my Patent 2,009,817 of July 30, 1935, and include the provision of an efficient, cheaply manufactured mechanism for freezing and storing perishable commodities. More specifically, its objects are to provide such an apparatus particularly adapted for freezing, storing and if desired, mechanically dispensing perishable commodities, such as ice cream, ice, frozen confections, chocolate bars, which may be broadly referred to as comestibles.

As stated in my prior application, in the use of vending or "automatic canteen" machines, conditions are frequently met wherein the suitable preservation of certain edibles presents a considerable problem. Thus, if it is desired to dispense from such apparatus comestibles, such as ice cream or frozen confections, very low temperatures must be maintained and at the same time it is highly desirable to maintain precise predetermined conditions of humidity.

As stated, the depositing of frost on the merchandise or the parts of the apparatus or mechanism exposed to the low temperature must be prevented as far as possible in coin-controlled delivery mechanisms. Frequent opening of a merchandise discharge compartment or delivery opening and other varying conditions constitutes non-uniform factors which must be met.

The above referred to patent was directed to the combination of an air cooling and conditioning mechanism with a storing and dispensing device. The present invention is an improvement in respect to certain features as to which the objects are briefly:

The provision of means for effecting automatic defrosting of the refrigerating and cooling coils consequent upon the opening of the merchandise compartment, as, while charging or refilling the compartment with merchandise to be stored and dispensed therefrom.

A unitary structure may be provided comprising a plurality of dispensing cabinets through which conditioned refrigerated air is passed from a common cooling passage and over a common cooling coil. Thus I am enabled to arrange a bank of associated dispensing cabinets and subject them to treatment by common refrigerating and air conditioning unit.

Inasmuch as the refrigerating unit is seldom if ever called upon to its full capacity, I find that I may utilize the capacity of the machine for still another advantage, namely, that of cooling the water supplied to a drinking fountain associated with the dispensing apparatus. It is therefore an object of the invention to so arrange the device that a separately controlled cooling coil connected in the same system may function to cool the coil through which passes the water supplied to a drinking fountain. This arrangement serves to bring customers more frequently to the location of the dispensing device, the advantage of which is obvious.

The above and other objects will become more apparent in the following description, in which Fig. 1 is a vertical section, partly in elevation through the refrigerating and air conditioning unit.

Fig. 3 is a vertical sectional view of a multiple vending unit device provided by my invention and showing a drinking fountain assembly associated therewith.

Fig. 4 is an electrical diagram showing the circuits to the motors and the controlling switches.

Fig. 5 is a vertical section, partly in elevation, through a refrigerating, air conditioning and merchandise dispensing unit, illustrating a modification of the apparatus shown in Fig. 1.

Fig. 6 is an enlarged fragmentary view showing the construction of the cooling coil which I may employ.

Fig. 7 is a vertical section, partly in elevation through the complete apparatus, as illustrated in Fig. 5 and taken at right angles to the plane of Fig. 5.

Fig. 8 is a diagrammatic view of the refrigerating circuit.

Figure 1:
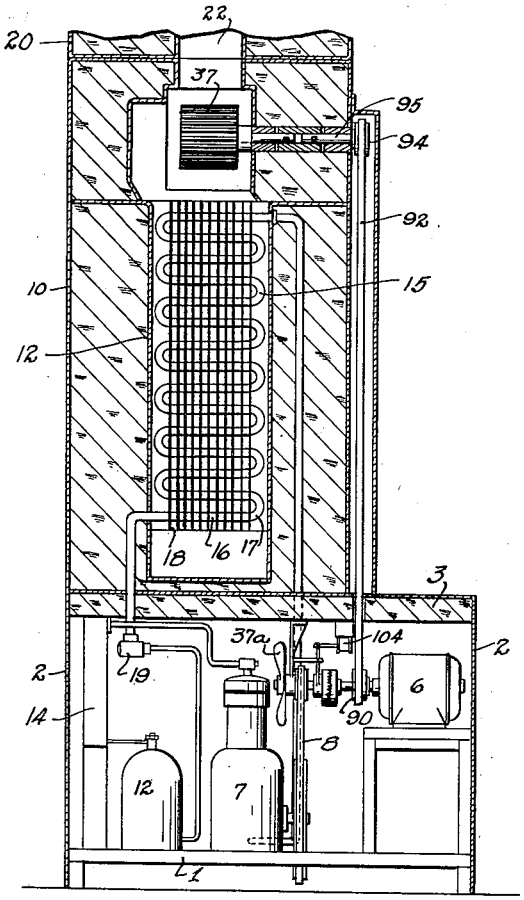

Referring to the drawings, in Fig. 1 is shown a suitable frame comprising horizontal elements as at 1 and vertical elements including side walls 2 supporting a platform-like member 3 which has insulation below it and above which is an insulating box-like member 10 within which is an inter-casing 12 for the cooling or expansion coils 15 of the refrigerating device. Forming a storage chamber 10 is a chamber or casing 20 also insulated, the lower portion of which is illustrated and to which leads an air passage 22 and which may comprise the chamber for food storage or storage and dispensing apparatus.

The refrigerating unit, preferably of a cheap compact durable type and as shown comprises a motor 6 driving a compressor 7 through a belt 8, the usual refrigerant storage tank 12 being connected with the condenser coil 14, which coil is in turn connected with the compressor. The expansion or refrigerating coil is of a special design, and its construction is best illustrated in Fig. 6 of the drawings. The expansion coil 15 is shown as comprising a plurality of reaches 16 and return bends 17 which extend outwardly from the radiating fins 18 of the chamber. The partition 43 provides for a return portion of the air passage leading to and from the merchandise chamber, as shall be presently described.

It will be noted that the expansion valve 19 is connected in a line connecting the storage tank 12 and one end of the expansion coil 15. The other end of the expansion coil is connected as usual to the compressor 7.

In the arrangement shown in Fig. 1, a single motor may serve to drive the compressor 7 of the refrigerating apparatus as well as the fan 37, thereby providing a means of economy and an elimination of a source of heat to the cooling chamber 22. I have shown on the shaft of the motor 6 a belt pulley 90 over which runs a belt 92 shown as driving at its upper end a larger pulley 94 on the shaft 95, carrying the fan 37. The pulley 90 which carries the belt 92 is driven directly on the shaft of the motor, whereas the belt 8 is driven by a pulley which may be connected or disconnected from the motor shaft by clutch means. This clutch means 96, 97 permits air to be continued to be circulated and to effect defrosting of the cooling coils at the time when the belt driving the compressor 7 is rendered inoperative.

Figure 2:
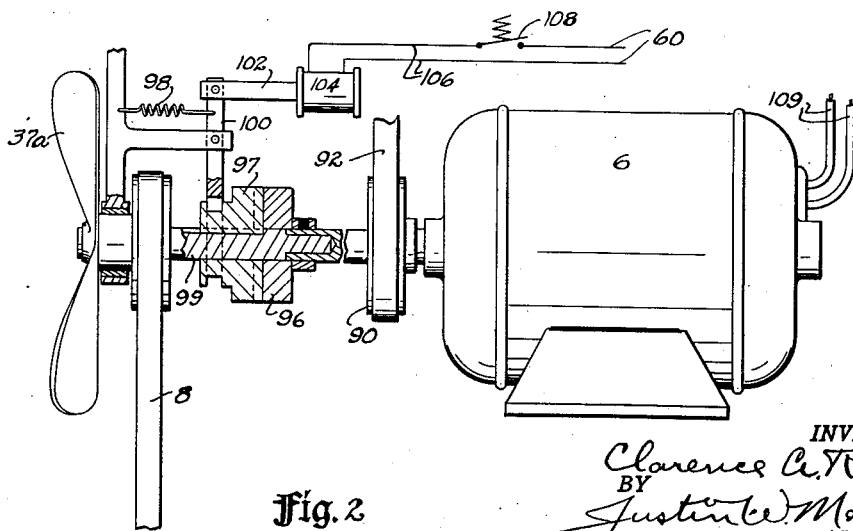
Fig. 2 is a fragmentary diagrammatic view on an enlarged scale, showing the motor connections for the refrigerating apparatus and circulating fan.

A suitable clutch arrangement is illustrated schematically in Fig. 2 wherein two elements 96 and 97 of the clutch means are normally urged together by a spring 98 to drive the extension 99 carrying the pulley driving the belt 8. The clutch member 97 may be actuated by the swinging yoke 100 connected with a solenoid armature 102 of solenoid 104. The solenoid is adapted to be energized through the conductors 106 and conductors 60, the latter being connected to a source of power, by closing a switch 108 when the front cover or door 29 is opened. The result is that the refrigerating system is disconnected while the circulating fan continues to run, there being conductors 109 leading to the motor 6.

When warm air enters the dispensing chamber as a result of the door to the merchandise compartment being opened, the warm air will be circulated through the merchandise chamber and over the cooling coils, or it may pass over the other parts of the apparatus under the influence of the fan for a brief time, that is a few minutes, during which time the compressor and correspondingly the evaporator remains idle. This warm air will melt any frost which may have formed in the merchandise compartment or elsewhere, and will result in some moisture draining from the parts of the merchandise carrying means and the coils 15 to the pan 105 at the bottom of the condenser 14, where it is subjected to the warmth of the condenser and in turn passes off into the atmosphere, which is stimulated by the action of fan 37a.

In Fig. 3 I have shown a suitable arrangement of a multiple unit device which is illustrative of many forms but the essential characteristic is that it comprises a bank of distributing and dispensing units treated by circulated and conditioned refrigerated air and having a common expansion coil chamber through which the air is returned from the merchandising compartments to the fan and again passed over the merchandise after being lowered in temperature.

In such an arrangement a series of units such as heretofore described and designated 20a are mounted side by side and encased in common insulating top, bottom, and side walls 10, and having front and back walls covered with insulation, preferably of the same character and thickness, although in some installations it may be required to be thinner. A common passage to a series of openings as at 40a leads to the individual compartments, whereas the openings 35a in the bottoms of the individual compartments serve to permit the air to be brought to the common return passage 42a extending horizontally across and below the dispensing or storage compartments. Arranged horizontally and of sufficient size to effectively accomplish the necessary cooling of the air are the expansion coils 15a to which the air is led at the left-hand end of the passage as indicated by the arrow, and from which the passage to the fan element 37 is of sufficient capacity to pass the amount of air required to cool the merchandise compartments. This fan is shown as mounted on the inner end of the shaft of the motor 50a and has a suitable insulating sleeve fitted between the motor and the fan.

The multiple unit device illustrated in Fig. 3 may be provided with a drinking fountain, if desired, the fountain being arranged in the same manner as the fountain which is described in detail in connection with the Patent Number 2,009,817. The fountain 112 is controlled by any suitable valve 113 and having a drain pipe 113'. The water pipe leading to the fountain passes through a brine tank 118 which tank is cooled by an expansion coil 15b being connected onto the refrigerant line 15c leading from the storage tank 12 to the evaporator 15a. An expansion valve 19a is placed in the line leading from the refrigerant line 15c to the expansion coil 15b, the valve being thermo-controlled so as to maintain the water at the desired temperature as delivered to the fountain.

Figs. 5 and 7 illustrate a modification of the apparatus used in driving the compressor 7 and the fan 37 wherein an additional motor 50 is used to directly drive the fan 37. The motor 6 through the belt 8 drives the compressor 7 and a fan 37a is directly attached to the shaft of the motor so as to dissipate the moisture which collects in container 105, the moisture collecting during a defrosting period.

The electrical wiring diagram of Fig. 4 represents a means of wiring the two motors 6 and 50 so as to have a continuous operation of motor 50 during a defrosting period. The conductors 60 represent a source of electrical energy to the motors and the interpositioning of thermal switch 7' in the conductor leading to the motor 50 affords a means of automatic control of operation of the motor 50 should operation of the refrigerating system become impaired. The thermal switch 7' has its control bulb in the return air stream at the entrance to the evaporator.

The switch 65 comprises three elements 64, 66 and 68 each insulated from the other but rigidly connected together. A circuit to the motor 6 is completed by the element 66 being in normal position, the motor being in series with the thermal switch 75, the functioning of this switch being dependent upon the temperature in the merchandise chamber.

Opening of the door 29, Fig. 7, causes a depression of the spring 69 and a consequent movement of switch 65 so that the switch elements take the position as represented by the solid lines. The arrangement of the switch 108, Figs. 2 and 7, relative to the door may be that as commonly used on domestic refrigerators for illuminating the comestible storage compartment upon opening of the door. Motor 50 will continue to operate through contacts 68 forming a new circuit if the thermal switch 7' be opened because of a considerable increase in temperature in the merchandise chamber. Motor 6 is de-energized and the thermal switch 75 may be open; however, closing of contacts 64 forms a return circuit for motor 50 and defroster elements 200 and 201. Closing of contact 68 causes the automatic closing of switch 204, completing a circuit through the defroster elements 200 and 201 as located in the evaporator 15. This defrosting apparatus is covered in detail in a co-pending application entitled Defrosting means for refrigerating apparatus, Serial No. 24,382, filed May 31, 1935.

Therefore, when it is found necessary to open the merchandise compartment, warm air entering will be circulated through the system by the continued operation of fan 37 and this warm air, in conjunction with the automatic operation of the defroster, provides a means of defrosting the evaporator coils and elements of the merchandise chamber during the interim when the refrigerating system is rendered inoperative by the movement of switch 65. If defrosting is desired during the operation of the refrigerating system, a manual means of control of the switch 204 can be provided.

The dispensing mechanism as illustrated in Fig. 5 provides a sloping chute 30 extending downwardly and sufficiently in connection with the chain carrier 22 to receive merchandise therefrom as the carrier passes over suitable shafts 23 and 24, and it is actuated by a hook lever under the control of a suitable coil control mechanism at 27.

Referring to Fig. 7, the refrigerated air being discharged by fan 37 is delivered through aperture 35 and passes up through the comestible storage chamber to the outlet aperture 40. The air then passes downwardly through passage 42 to the inlet of the evaporator 15 where it continues in its downward direction until it reaches the end of partition 43 where it then begins its upward flow to the outlet of the evaporator and to the inlet of fan 37. A jacket of brine is provided between the walls of housing 20 and parallel walls 28. This comestible dispensing mechanism and its structure are described in the above mentioned patent.

The door 29 provides a means of delivering comestibles into the storage compartment 22 and its movement actuates the switch 108 which controls the energization of motor 6 as above described and illustrated in Fig. 2 and switch 65 as illustrated in Fig. 4.

Fig. 8 is a diagrammatic illustration of a refrigerating circuit which may be employed in this dispensing apparatus. It consists of compressor 7, condenser 14 delivering the refrigerant as condensed to storage tank 12, and the flow of refrigerant to the evaporator coils 15 is controlled by an expansion valve, preferably that as described in my co-pending application entitled Refrigerating apparatus, Serial No. 24,381, filed May 31, 1935. The amount of refrigerant passing through the expansion valve 19 is controlled by the functioning of the thermal bulb 70 which is attached onto the conduit leading from the outlet of the evaporator to the inlet of the compressor.

The evaporator coils are of ordinary construction; however, the heat radiating fins 18, Fig. 6, which may be attached to the reaches 15 afford a means of increasing the efficiency of the evaporator as described in my co-pending application entitled Air conditioning system, Serial No. 45,295, filed October 16, 1935.

From the foregoing description, it will be seen that I have provided a simple, efficient means for cooling and conditioning of air used to preserve comestibles or the like as stored in a dispensing unit. I have found in practice that it is effective in operation and may be cheaply manufactured. Various modifications and alterations in structure and arrangement of the various parts in this apparatus may be made without departing from the spirit of my invention, and I do not wish to be limited otherwise than according to the scope of the appended claims.

Having thus described my invention, what I claim is:

1. In a refrigerating and dispensing apparatus, the combination of a chamber having a plurality of merchandise dispensing and delivering mechanisms therein, individual actuating means for each of such mechanisms, a passage leading to and from the chamber, a refrigerating cooling coil unit in said passage, a fan for circulating air through the chamber from each of said mechanisms and over said cooling coil, a compressor, condenser and evaporator forming a refrigerator system, a shunt in the evaporator of said system, and a container for cooling medium inclosing portion of said shunt, a drinking fountain and a tube leading therethrough passing through said cooling medium.

2. In a refrigerating and dispensing apparatus including a merchandise chamber, an opening in said chamber, a door normally closing the opening, air duct means leading to and from the merchandise chamber, a refrigerating mechanism having a heat absorbing unit positioned within the air duct means, a circulating means for circulating air from the chamber through the air duct means in heat exchanging relation to the heat absorbing unit and back into the merchandise chamber, a driving means for the refrigerating mechanism, a driving means for the circulating means, defrosting means associated with said heat absorbing unit, circuits for connecting to a source of electrical energy the driving means of the circulating means, the driving means of the refrigerating mechanism and the defrosting means, and including an interrupting means operated consequent upon closing the door to close the circuit to the driving means of the circulating means, to close the circuit to the driving means of the refrigerating mechanism, and to open the circuit to the defrosting means, and said interrupting means being further operative, consequent upon opening the door, to open the said circuit to the driving means of the circulating means, to open the circuit to the driving means of the refrigerating mechanism, and to close the circuit to the defrosting means.

3. In a refrigerating and dispensing apparatus including a merchandise chamber, an opening in said chamber, a door normally closing the opening, air duct means leading to and from the merchandise chamber, a refrigerating mechanism having a heat absorbing unit positioned within the air duct means, a circulating means for circulating air from the chamber through the air duct means in heat exchanging relation to the heat absorbing unit and back into the merchandise chamber, a driving means for the refrigerating mechanism, a driving means for the circulating means, defrosting means associated with said heat absorbing unit, and an electrical energization and control system comprising a circuit means connected to the driving means of said circulating means and including a thermal interrupting means, a second circuit to said driving means of said circulating means and including an interrupting means, a circuit to said defrosting means and including an interrupting means, a circuit to said refrigerating mechanism and including an interrupting means, each of said circuits being connected to a source of electrical energy, and actuating means operatively connected to the interrupting means of the second circuit of said circulating means, of the circuit to said defrosting means, and of the circuit to said refrigerating mechanism, and said actuating means being operative, consequent upon closing the door, to open the said second circuit to the driving means of the circulating means, to close the circuit to the driving means of the refrigerating mechanism, and to open the circuit to the defrosting means, and said actuating means being further operative, consequent upon opening the door, to open the circuit to the driving means of the refrigerating mechanism, to close the circuit to the defrosting means, and to close the said second circuit to the circulating means.

CLARENCE A. RODMAN.